(12) United States Patent
Anderson et al.

(10) Patent No.: US 9,908,142 B2
(45) Date of Patent: Mar. 6, 2018

(54) WEB LIFTER/STABILIZER AND METHOD

(71) Applicant: MegTec Systems, Inc., DePere, WI (US)

(72) Inventors: Kim A. Anderson, DePere, WI (US); Eric Maki, DePere, WI (US); George Glenn, DePere, WI (US)

(73) Assignee: Babcock & Wilcox MEGTEC, LLC, De Pere, WI (US)

( * ) Notice: Subject to any disclaimer, the term of this patent is extended or adjusted under 35 U.S.C. 154(b) by 0 days.

(21) Appl. No.: 14/966,108

(22) Filed: Dec. 11, 2015

(65) Prior Publication Data

US 2016/0096191 A1 Apr. 7, 2016

Related U.S. Application Data

(62) Division of application No. 14/122,753, filed as application No. PCT/US2012/040667 on Jun. 4, 2012.

(Continued)

(51) Int. Cl.
*B05D 1/02* (2006.01)
*B05C 11/10* (2006.01)
(Continued)

(52) U.S. Cl.
CPC .............. *B05D 1/02* (2013.01); *B05B 12/02* (2013.01); *B05C 3/132* (2013.01);
(Continued)

(58) Field of Classification Search
CPC ............................. B05C 3/132; B05C 5/0254
See application file for complete search history.

(56) References Cited

U.S. PATENT DOCUMENTS 4,064,288 A 12/1977 Shah et al.
4,108,110 A 8/1978 Berry
(Continued)

FOREIGN PATENT DOCUMENTS

CA 2171990 A1 9/1996
CN 1662671 A 8/2005
(Continued)

OTHER PUBLICATIONS

Chinese communication, with English translation, dated Apr. 20, 2016 in corresponding Chinese patent application No. 201280027173.1.
(Continued)

*Primary Examiner* — Xiao S Zhao
(74) *Attorney, Agent, or Firm* — Nields, Lemack & Frame, LLC

(57) ABSTRACT

Web lifter and/or stabilizer and method of lifting and/or stabilizing a travelling web and for coating a web. The device creates a web hold down force via a negative pressure slot at its exit side, which draws the web down against the surface on the entry side. The device can be actuated to move the web relative to a slot die coater off the die lips and stop the application of slurry to the web, thereby creating uncoated regions on the web surface. The device can then be actuated to move the web back into contact with the coater to start the application of slurry to the web, thereby creating coated regions on the web surface. Web lifting can be accomplished by rotating the device in first and second directions to lift the web off of the slot die coater and return the web back into contact with the coater.

12 Claims, 23 Drawing Sheets

Related U.S. Application Data

(60) Provisional application No. 61/493,046, filed on Jun. 3, 2011.

(51) Int. Cl.
| | | |
|---|---|---|
| *B05C 3/132* | (2006.01) | |
| *B05B 12/02* | (2006.01) | |
| *B65H 23/032* | (2006.01) | |
| *B65H 37/00* | (2006.01) | |
| *B05C 5/02* | (2006.01) | |

(52) U.S. Cl.
CPC ...... *B05C 11/1042* (2013.01); *B65H 23/0322* (2013.01); *B65H 37/00* (2013.01); *B05C 5/0254* (2013.01)

(56) References Cited

U.S. PATENT DOCUMENTS

| | | | |
|---|---|---|---|
| 4,288,475 | A | 9/1981 | Meeker |
| 4,912,948 | A | 4/1990 | Brown et al. |
| 5,360,629 | A | 11/1994 | Milbourn et al. |
| 5,989,622 | A | 11/1999 | Iwashita et al. |
| 6,540,833 | B1 | 4/2003 | Gibson et al. |
| 6,561,884 | B1 | 5/2003 | White et al. |
| 6,984,412 | B2 | 1/2006 | Tanaka |
| 2001/0012588 | A1 | 8/2001 | Kaido et al. |
| 2002/0007552 | A1 | 1/2002 | Singleton et al. |
| 2004/0030514 | A1 | 2/2004 | Popp et al. |
| 2004/0062866 | A1 | 4/2004 | Masuda et al. |
| 2004/0094263 | A1 | 5/2004 | Middlestadt et al. |
| 2005/0089640 | A1 | 4/2005 | Tanaka |
| 2005/0136189 | A1 | 6/2005 | Blincoe et al. |
| 2005/0158467 | A1 | 7/2005 | Buckley et al. |
| 2005/0223976 | A1 | 10/2005 | Platzer |
| 2006/0210714 | A1 | 9/2006 | Huizinga et al. |
| 2008/0041305 | A1 | 2/2008 | Pekurovsky et al. |
| 2008/0276488 | A1 | 11/2008 | Seidl et al. |
| 2009/0130323 | A1 | 5/2009 | Elsner |
| 2009/0218046 | A1 | 9/2009 | Yamamoto et al. |
| 2014/0120258 | A1 | 5/2014 | Anderson et al. |
| 2014/0255607 | A1 | 9/2014 | Maki et al. |

FOREIGN PATENT DOCUMENTS

| | | | |
|---|---|---|---|
| CN | 101522990 | A | 9/2009 |
| CN | 101574684 | A | 11/2009 |
| CN | 201676811 | U | 12/2010 |
| EP | 1895051 | A1 | 3/2008 |
| JP | 61-220759 | A | 10/1986 |
| JP | 9-108605 | A | 4/1997 |
| JP | 2001-191005 | A | 7/2001 |
| JP | 2011-92855 | A | 5/2011 |
| JP | 2014-522352 | A | 9/2014 |

OTHER PUBLICATIONS

Final rejection dated Sep. 22, 2016 in co-pending U.S. Appl. No. 14/122,753.
Final rejection dated Oct. 5, 2016 in co-pending U.S. Appl. No. 14/008,103.
Korean communication, with English translation, dated Mar. 9, 2016 in corresponding Korean patent application No. 10-2013-7031646.
Office action dated Mar. 23, 2016 in co-pending U.S. Appl. No. 14/008,103.
Office action dated Mar. 9, 2016 in co-pending U.S. Appl. No. 14/122,753.
Canadian communication dated Jul. 7, 2016 in corresponding Canadian patent application No. 2,836,081.
European communication dated Apr. 5, 2017 in corresponding European patent application No. 12792286.2.
Korean communication, with English translation, dated Mar. 9, 2017 in corresponding Korean patent application No. 10-2016-7011923.
International Search Report and Written Opinion dated Jul. 5, 2012 in corresponding PCT application No. PCT/US2012/033508.
International Preliminary Report on Patentability dated Oct. 24, 2013 in corresponding PCT application No. PCT/US2012/033508.
International Search Report and Written Opinion dated Aug. 27, 2012 in corresponding PCT application No. PCT/US2012/040667.
International Preliminary Report on Patentability dated Dec. 19, 2013 in corresponding PCT application No. PCT/US2012/040667.
European communication dated Nov. 5, 2014 in corresponding European patent application No. 12792286.2.
Canadian communication dated Mar. 5, 2015 in corresponding Canadian patent application No. 2,836,081.
Japanese communication, with English translation, dated Jun. 16, 2015 in corresponding Japanese patent application No. 2014-513779.
Korean communication, with English translation, dated Aug. 19, 2015 in corresponding Korean patent application No. 10-2013-7031646.
Canadian communication dated Dec. 10, 2015 in corresponding Canadian patent application No. 2,836,081.
Chinese communication, with English translation, dated Aug. 31, 2015 in corresponding Chinese patent application No. 201280027173.1.
Office action dated Sep. 14, 2015 in co-pending U.S. Appl. No. 14/122,753.
Office action dated Jan. 30, 2017 in co-pending U.S. Appl. No. 14/008,103.
Japanese communication, with English translation, dated May 30, 2017 in corresponding Japanese patent application No. 2016-129046.
Chinese communication, with English translation, dated Jun. 26, 2017 in corresponding Chinese patent application No. 201610036200.1.
Korean communication, with English translation, dated Aug. 7, 2017 in corresponding Korean patent application No. 10-2017-7012394.
Examiner's Answer to Appeal Brief dated Sep. 26, 2017 in co-pending U.S. Appl. No. 14/122,753.
Final rejection dated Jan. 16, 2018 in co-pending U.S. Appl. No. 14/008,103.

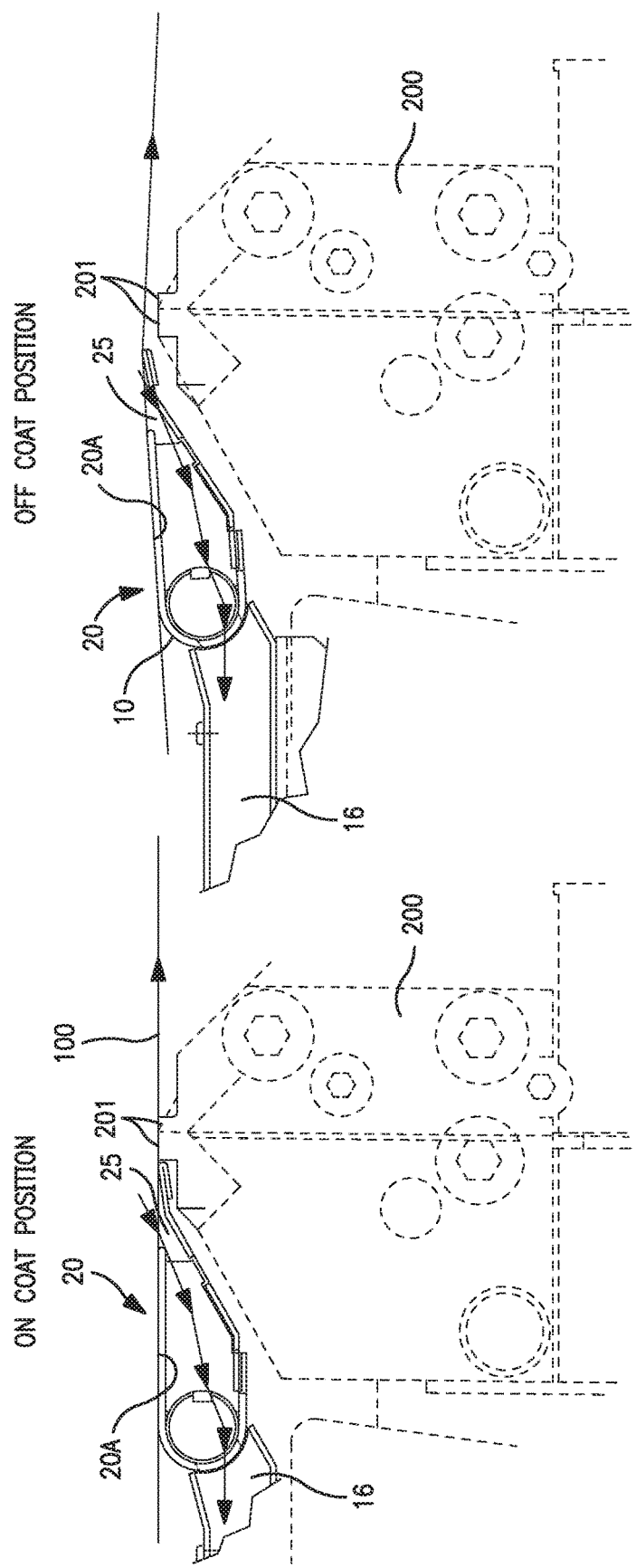

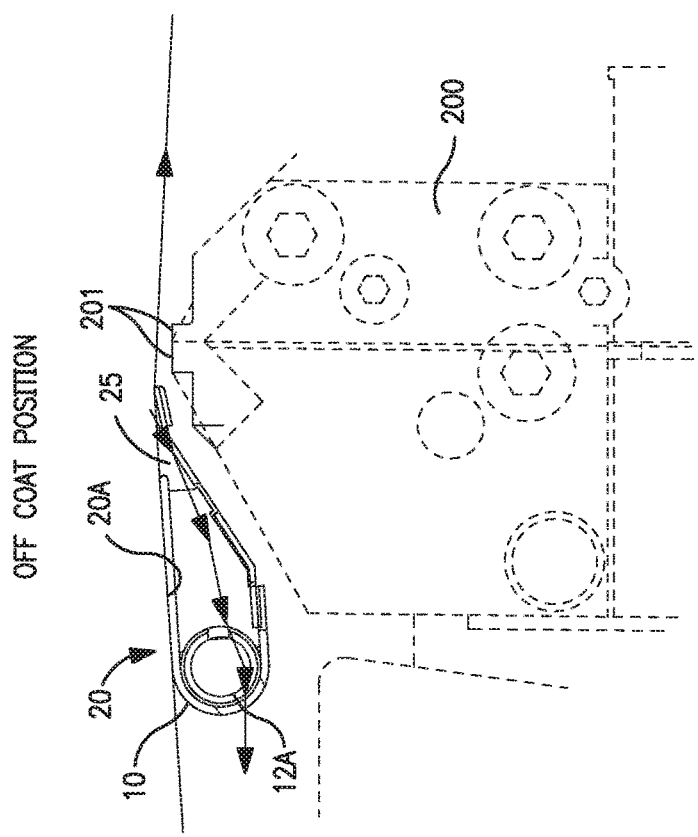
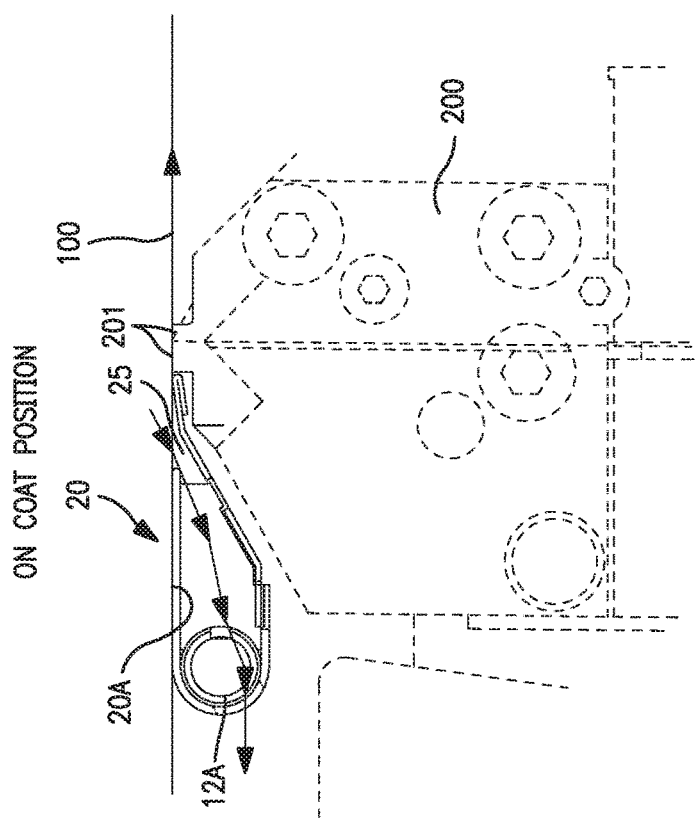

WEB LIFTER/STABILIZER AND METHOD

This application is a divisional of U.S. patent application Ser. No. 14/122,753 filed Nov. 27, 2013, the disclosure of which is incorporated herewith by reference. U.S. patent application Ser. No. 14/122,753 is a 371 of International Application No. PCT/US2012/040667 filed Jun. 4, 2012, which claims priority of U.S. Provisional Application Ser. No. 61/493,046 filed Jun. 3, 2011, the disclosure of which is hereby incorporated by reference. This application is related to co-pending International Application No. PCT/US2012/033508 filed on Apr. 13, 2012, the disclosure of which is hereby incorporated by reference.

BACKGROUND

The embodiments disclosed herein relate to an apparatus and method for lifting and/or stabilizing a web, particularly applicable in intermittent coating operations, such as those used in manufacturing batteries, where the substrate is coated in a series of discrete patches. Further embodiments relate to a method for controlling said apparatus to provide precise control of length and thickness profile of said discrete coating patches.

There are various applications in which it is desirable to deposit a coating onto at least a portion of a sheet of material. For example, in some embodiments, the electrodes of batteries are produced by applying a layer or coating to a sheet, and then cutting the sheet into portions of a suitable dimension. Of particular importance is that the layer be applied at a uniform thickness. In some embodiments, the layer or coating is not applied to the sheet in the region where the sheet will subsequently be cut.

In the manufacture of lithium ion batteries and the like, there is a coating process that applies anode slurry to a conductive substrate (e.g., copper foil) and another coating process that applies cathode slurry to a conductive substrate (e.g., aluminum foil). In these two coating processes, there are two different methods of coating: discontinuous, also referred to as skip or patch coating, and continuous coating. In the practice of either method, the coating material may be applied to the continuously moving substrate in the form of one or more lanes running parallel to the travel direction of said continuously moving substrate. One method of coating known to those skilled in the art has a backing roller on which the moving substrate is conveyed in an arcuate path as it is supported and is positioned precisely by the surface of said backing roller. In some cases, it is not convenient or even possible to allow the web to contact a backing roller, such as in the case of coating both sides of the web with a wet material before both said applied coatings are dried. In the practice of the embodiments disclosed herein, the web is conveyed in a free span between web support elements. Said web support elements could be one or more idler rollers, vacuum tables or air flotation bars which position and guide the path of web travel in a straight path.

An example of such a prior art system is shown in FIG. 15, wherein slurry is applied to the moving substrate web 310 in a free span between web support elements 315 and 320 via a slot die coater 70 attached to a pumping station. The coating is typically held in a tank or reservoir 30. The coating is drawn from the reservoir 30, through conduit 31 by pump 40. The coating is then passed through conduit 32 by the action of the pump 40. In the case where coating is not being applied to the sheet 10, bypass valve 63 is open while supply valve 60 is closed. This allows the coating that is pumped through conduit 32 to pass through conduit 33 and back to reservoir 30. In the case where coating is being applied to the sheet 10, the bypass valve 63 is closed, while supply valve 60 is opened. This permits the flow of coating through conduit 62 to the nozzle 70, and onto the sheet 10. While the supply valve 60 is open, the coating is discharged by the nozzle 70. However, when the supply valve 60 is closed, the pressure needed to propel the coating through the nozzle 70 is eliminated. In some cases, this causes excess coating material to remain in the cavity, or manifold 71, and the lips 72 of the nozzle. When the supply valve is next opened, this excess material may cause an uneven application of coating to the sheet 10. FIG. 16 shows an example of the result of this phenomenon on the coated patch thickness. Coated patch 500 is shown as a cross-section profile of thickness "x" applied to web 10. As the sheet moves toward the left, starting profile 520 is thicker than the rest of the coating 500. This excess material 510 is due to the residual coating material that remained in the nozzle 70 after the supply valve 60 was closed. In this figure, the ending profile 525 is shown to be uneven, as the valves may be transitioning while the coating is still being applied. Such an uneven coating may be unacceptable.

Therefore, to prevent this uneven application, a fluid suction mechanism 80' may be used, as shown in FIG. 15. This fluid suction mechanism is used to draw the excess coating that is left in the manifold 71 or on the lips 72 away from the nozzle 70. In operation, pump 40 draws coating material from reservoir 30. The coating material passes through conduits 31, 32 and is directed toward the nozzle 70, where it is discharged onto the sheet 10 as the sheet is drawn past roller 15. To stop the flow of coating onto the sheet 10, the bypass valve 63 is opened and the supply valve 60 is closed, thereby diverting the coating material through conduit 33 and back into the reservoir 30. To remove excessive coating material that may be present in the manifold 71 or on the lips 72 of the nozzle 70, valve 85 is opened to suction source 80 so that fluid is drawn by vacuum through conduit 86 which is in fluid communication with die manifold 71. The suction source 80 is typically comprised of a vacuum reservoir tank in communication with a suction pump to create a draw of fluid from die cavity 71 when valve 85 is opened. Coating fluid material is collected in said reservoir tank and periodically removed for reuse or, more often, discarded as waste material.

To restart the flow of coating onto the sheet 10, valve 85 is closed to remove the vacuum drawing fluid through conduit 86. Bypass valve 63 is closed while supply valve 60 is opened.

In the practice of free span coating, the planarity of the web is of significant importance in applying a uniform thickness of coating fluid to the web in the direction of web travel and in the cross-web direction. As the foil web approaches the slot die coater, the web must remain flat as it travels over the slot die coater, but due to a baggy web or tension corrugation in the thin foil, the web will tend to lift off the slot die coater or otherwise deviate from the desired path of travel resulting in a non-uniform gap between the fluid discharge lips of said slot die coater and the web surface to be coated. Without a uniform gap to the slot die coater discharge lips, the coating process creates defects in the coated web, such as non-uniform thickness of applied coating, ridges or streaks.

It therefore would be desirable to provide an apparatus and method for stabilizing the web in the free span to help provide defect-free coatings. It would also be desirable to utilize the same apparatus to move the web relative to the slot die coater to an off coat position in order to create the uncoated portion of the web, and return the web to an on coat position in order to create the coated portion of the web. This web movement would be especially useful in discontinuous coating of patches in precise position spacing and uniformity to precisely control the lengths and thickness profile of the coated and non-coated patches along the direction of travel. It would further be desirable to provide a device for guiding and flattening a running web.

SUMMARY

Problems of the prior art have been overcome by the embodiments disclosed herein, which relate to a web lifter and/or stabilizer and method of lifting and/or stabilizing a travelling web of material. In accordance with certain embodiments, the device creates a web hold down force via a negative pressure slot at the exit side of the device. This negative pressure slot draws the web down against the surface on the entry side of the device, which in certain embodiments is a highly polished flat metal surface. The need for a precision backing roll is eliminated.

In accordance with certain embodiments, the device can be actuated to move the web relative to a slot die coater used in a skip coating or intermittent coating operation, to move the web off the die lips and stop the application of coating (e.g., slurry) to the web, thereby creating uncoated regions on the web surface. The device can then be actuated to move the web back into contact with the slot die coater to start the application of coating to the web, thereby creating coated regions on the web surface. In certain embodiments, the web lifting is accomplished by rotating the device in a first direction to lift the web off of the slot die coater and rotating the device back in an opposite direction to return the web back into contact with the slot die coater. A controller can be used to actuate the device.

In accordance with certain embodiments, the device can be used to guide and flatten a travelling web in a web path. Such a device need to be rotatable when lifting the web of a slot die coater is not necessary.

In certain of its method aspects, in certain embodiments a coater for intermittently applying a coating to a web is provided, and the web lifter and/or stabilizer is provided upstream of the coater, in the direction opposite of web travel, in a first position. Negative pressure is applied to the web lifter and/or stabilizer body, causing air to enter the air entry slot and flow to the vacuum chamber. When a gap or skip in coating is desired on the web surface, the web lifter body is rotated from the first position in a direction toward the web to deflect the web away from the coater (e.g., away from the coater lips) to form a coating gap (e.g., an area devoid of coating) on the web. The body is then rotated back to the first position once the desired gap is formed, and negative pressure is maintained during both direction rotations.

In a preferred embodiment, a computer-controlled fluid delivery system provides precise control of the actuation of the valves and movement of the web lifter/stabilizer to create a plurality of coating profiles. The system includes a controller, which is used to actuate the valves to begin and terminate the flow of material onto the sheet through a slot die nozzle. In addition, the controller may displace the web from its on-coat position to an off-coat position away from the sheet by movement of the web lifter/stabilizer. In some embodiments, a fluid displacement mechanism is used to temporarily withdraw coating fluid from the slot die lips during the off-coat cycle and return the fluid to the lips during the next on-coat cycle. In two-side coating embodiments, the controller is also able to control the start and end locations of the coated patches on the opposite side of the sheet. Registration of the coating can be programmed to be in exact alignment, or advanced or delayed by a specific amount. In addition, the present system is a position based system, thereby being capable of automatically accommodating changes in line speed.

BRIEF DESCRIPTION OF THE DRAWINGS

FIGS. 13A and 13B are schematic diagrams showing the web lifter and stabilizer and a slot die coater in the on coat position and the off coat position in accordance with certain embodiments;

FIGS. 14A and 14B are schematic diagrams showing the web lifter and stabilizer and a slot die coater in the on coat position and the off coat position in accordance with certain alternative embodiments.

DETAILED DESCRIPTION

Figure 1A:
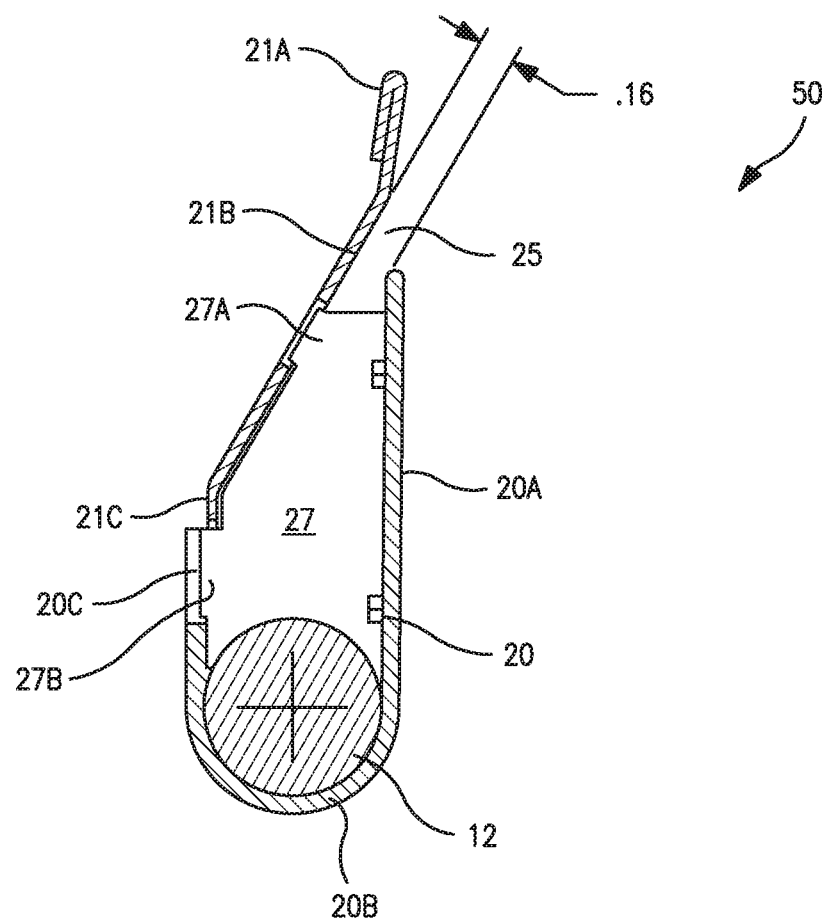
FIG. 1A is a cross-sectional view of a portion of the web lifter and stabilizer in accordance with certain embodiments.
Figure 1B:
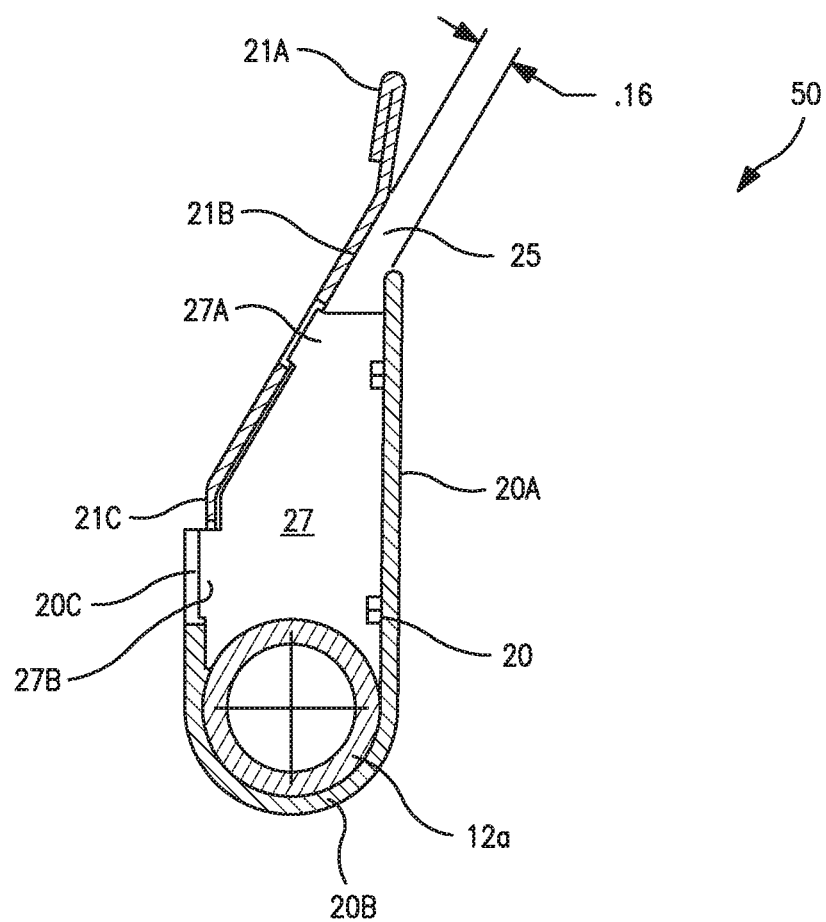
FIG. 1B is a cross-sectional view of a portion of the web lifter and stabilizer in accordance with an alternative embodiments.
Figure 10:
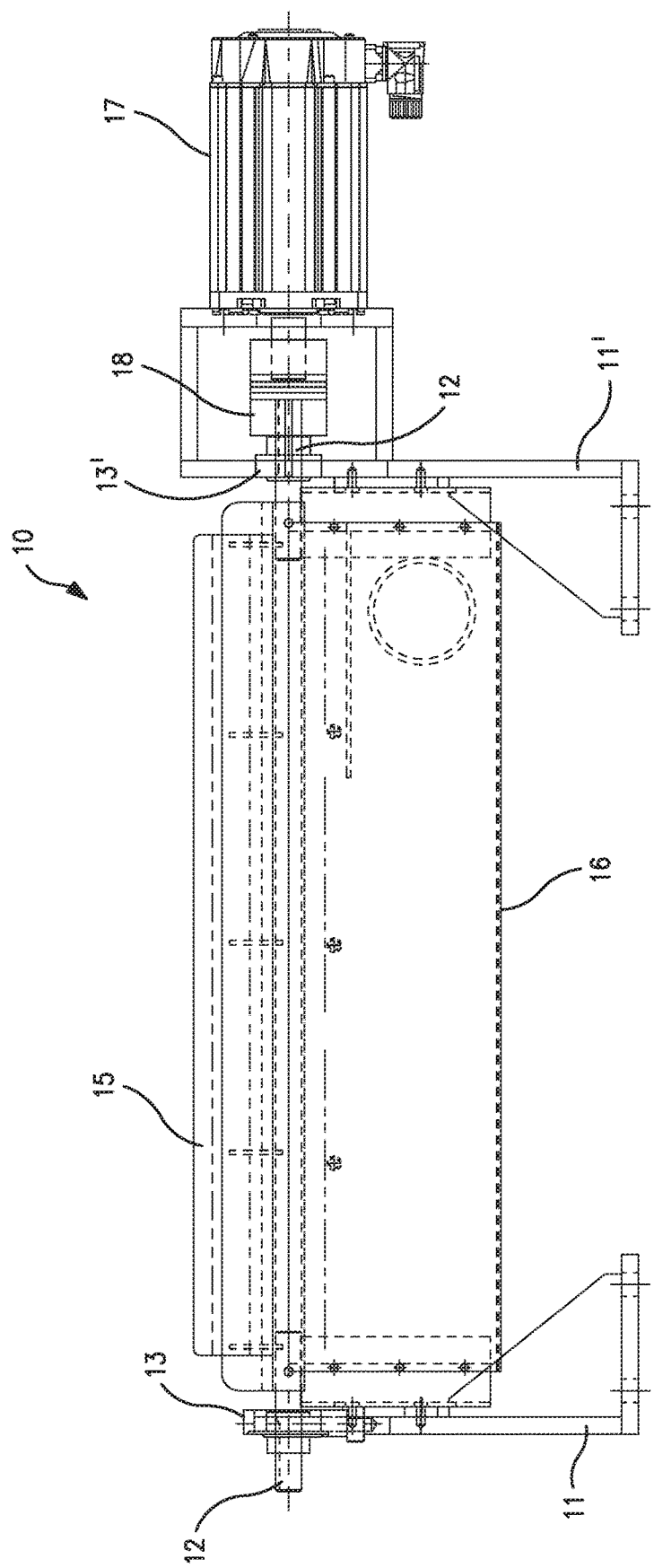
FIG. 10 is a top view of the complete assembly of web lifter and stabilizer in accordance with certain embodiments.
Figure 11:
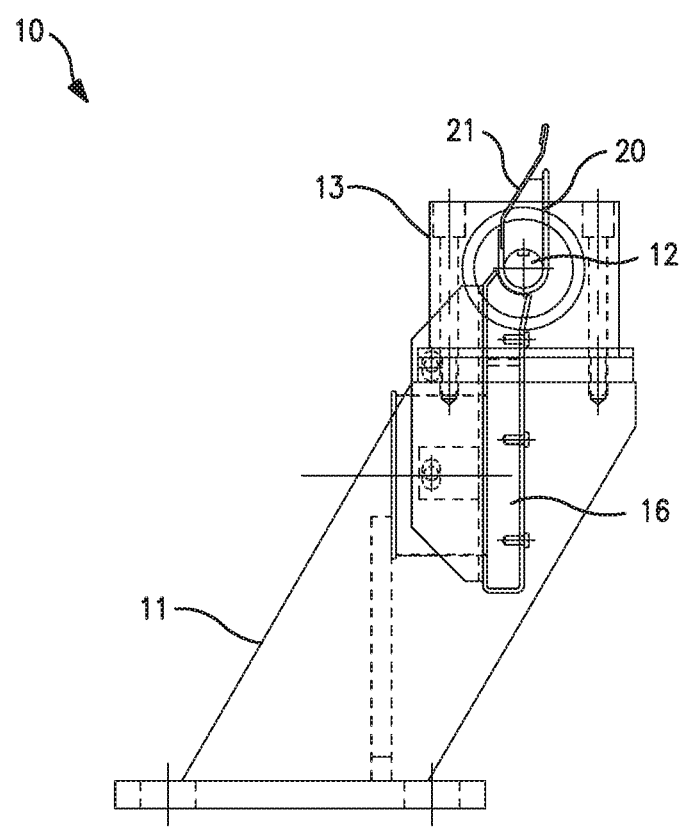
FIG. 11 is a first side view of the web lifter and stabilizer assembly in accordance with certain embodiments.
Figure 12:
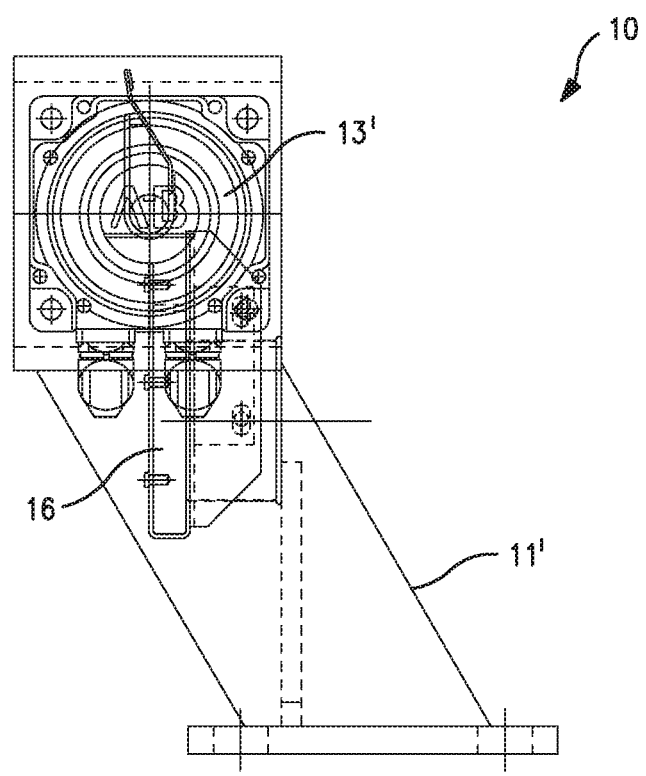
FIG. 12 is a second side view of the web lifter and stabilizer assembly in accordance with certain embodiments.
Figure 15:
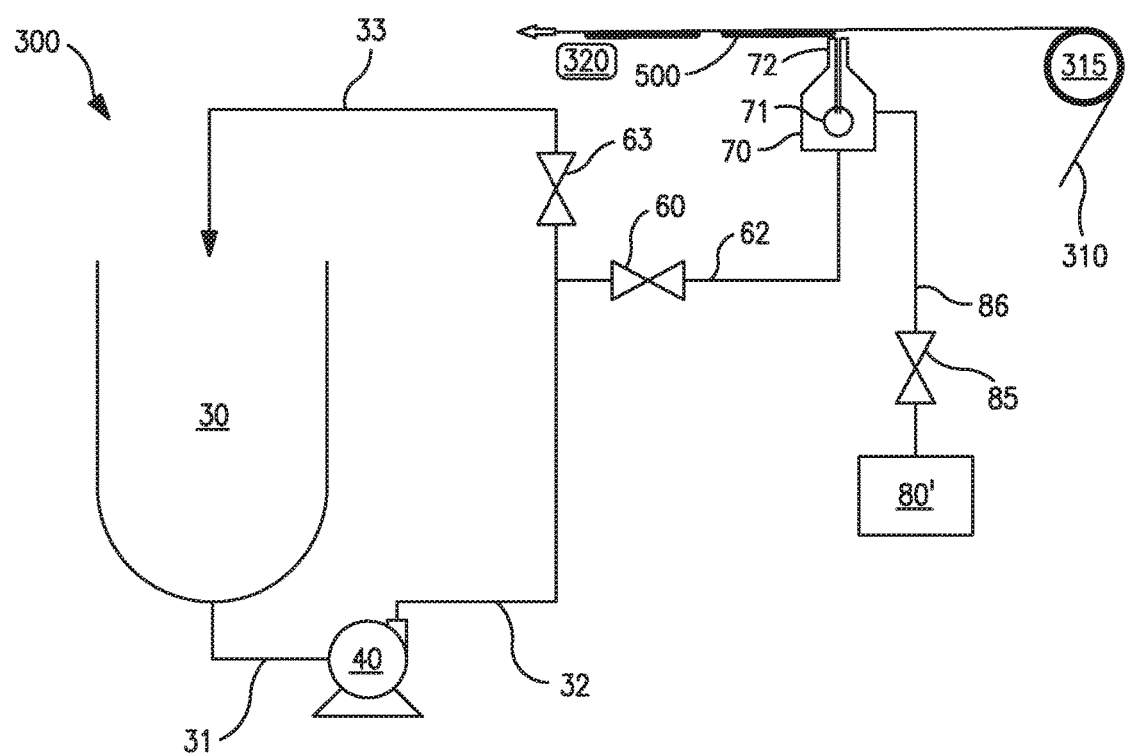
FIG. 15 shows an example of prior art practice in coating a web in free span with a slot die nozzle.

Turning first to FIGS. 10-12, there is shown an exemplary embodiment of a web lifter and stabilizer assembly 10 in accordance with certain embodiments. The assembly 10 includes mounting brackets 11, 11', which support a pair of oppositely located shaft stubs 12 via bearing mounts 13, 13', web lifter and stabilizer 15, and vacuum reservoir 16. The web lifter and stabilizer has a rotatable element 15 comprised of a wing-shaped body 50 (FIG. 1) having a first portion defining a leading edge of said apparatus when in operation, and a second portion defining a trailing edge when in operation, the first portion being spaced from the second portion so as to define a slot 25 between them for the entry of air upon the application of negative pressure to the body 50. Vacuum reservoir 16 is in fluid communication with the body 50 for receiving air entering the slot 25; the body being rotatable between a first position in which the web travels in an undeflected state, and a second position in which the web is deflected by the body 50 so as to travel in a deflected state. A driving force, such as a servo-motor 17, is attached to the shaft stubs 12 that are welded to each end of the body 50 to rotate this body 50. A 3000 rpm motor has been found to be suitable, although the embodiments disclosed herein are not limited thereto. For example, an air cylinder activated by a solenoid-operated valve could be mechanically coupled to said shaft to move the lifter assembly between the coat and off-coat positions. One of the shaft stubs 12 is attached to the motor via a coupling 18. A bellows servo style coupling has been found to be suitable for this purpose, although the embodiments disclosed herein are not limited thereto. In certain embodiments, two shaft stubs are provided and welded to the body with a space in between for air from slot 25 to pass through apertures 24a through 24n into reservoir 16.

Figure 4:
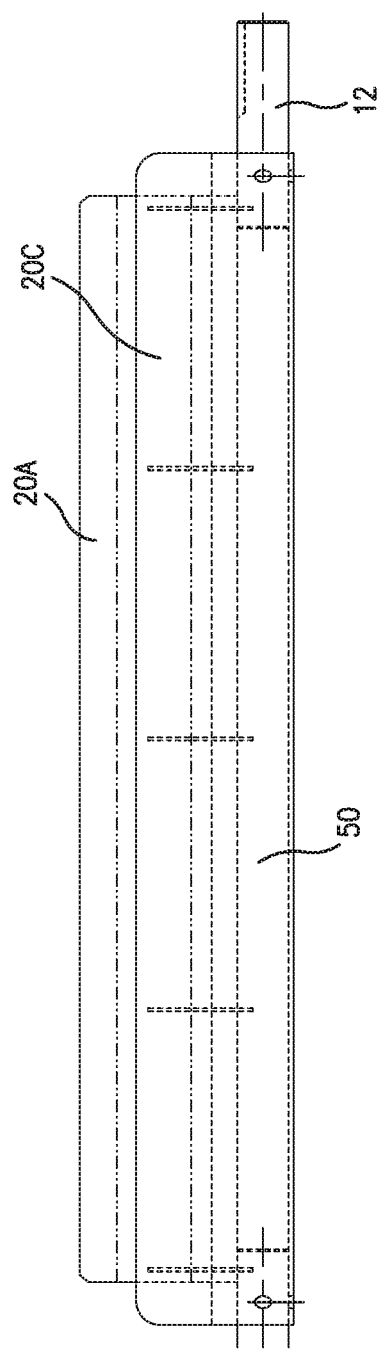
FIG. 4 is a top view of the portion of FIG. 1A.
Figure 4A:
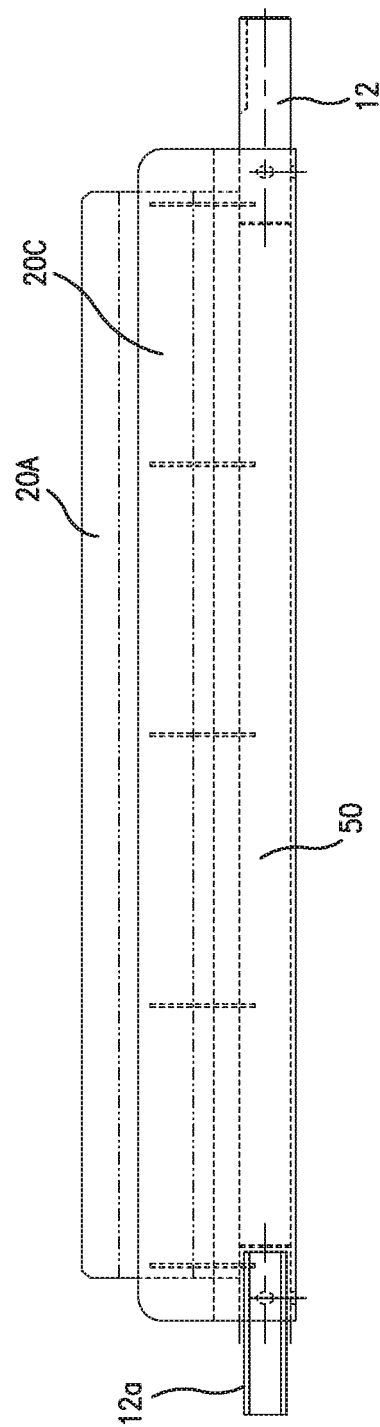
FIG. 4A is a top view of the portion of FIG. 1B in accordance with an alternative embodiment.

In a preferred embodiment, the vacuum reservoir 16 and apertures 24a to 24n are eliminated and the suction air flow path is alternatively made through one or more hollow shafts 12a (FIGS. 1B and 4A) connected by suitable means such as a flexible hose or rotary fitting (not shown) to a suction source. In this embodiment, the hollow shaft 12a can replace the solid shaft 12 and one or both ends of the assembly 50. The shafts can be shaft stubs (rather than full length of the assembly) that do not extend all the way across the length of assembly 50. This allows the air to pass through the bulbous part of the wing assembly 50. In FIG. 4A (which corresponds to an end view shown in FIG. 1B) the hollow shaft stub 12A extends only partly into the assembly 50, as shown. Similarly, the non-hollow shaft stubs 12 in the embodiment of FIG. 4 (which corresponds to an end view shown in FIG. 1A) extend only partly into the assembly 50. In both embodiments 4 and 4A, the air enters the slot 25 and is guided inside the wing assembly bounded by surfaces of the J shaped member 20, the bent member 21, and the gussets 27 which close off each end of the wing assembly in conjunction with the shaft stubs 12 or 12A. In the embodiment of FIG. 4, the air then passes through apertures 24a-24n as depicted in FIGS. 13A and 13B, and into vacuum reservoir 16. In the embodiment of FIG. 4A having hollow shaft stubs 12A, the apertures in the J-shaped member 20 and the vacuum reservoir 16 are eliminated. The air flow path from slot 25 is again bounded by surfaces of the J shaped member 20 (devoid of apertures) and the bent member 21 and guided to one or both ends of wing assembly 50 having at least one hollow shaft stub 12A connected to a suction source. The air passes through the hollow shaft stub or shaft stubs 12A into the suction source (not shown) as depicted in FIGS. 14A and 14B.

Figure 5:
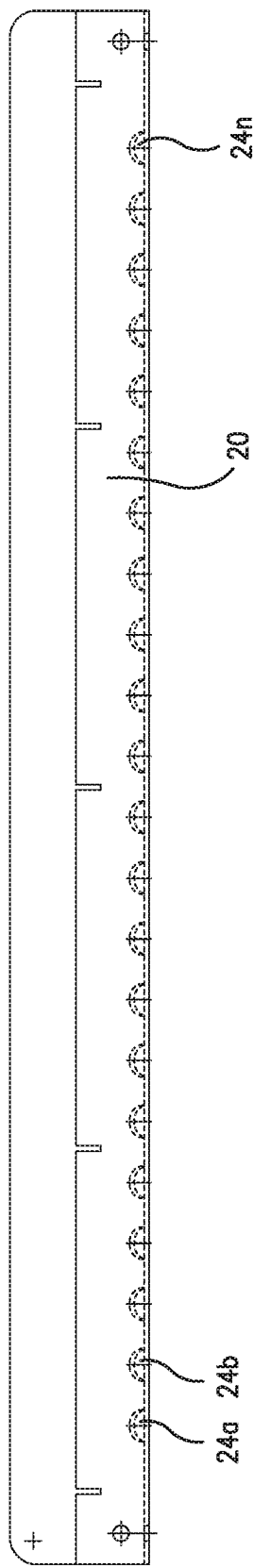
FIG. 5 is a bottom view of a portion of the web lifter stabilizer in accordance with certain embodiments.
Figure 6:
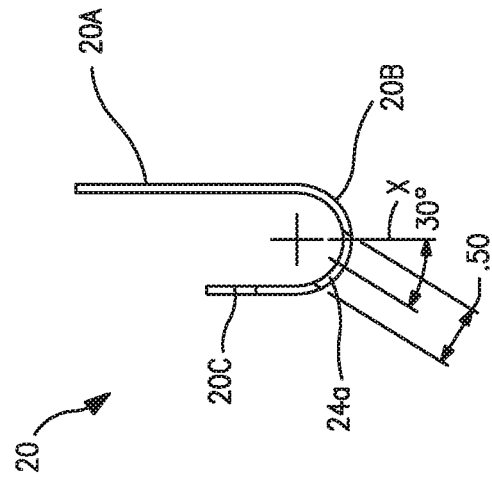
FIG. 6 is a cross-sectional view of the portion of FIG. 5.
Figure 7:
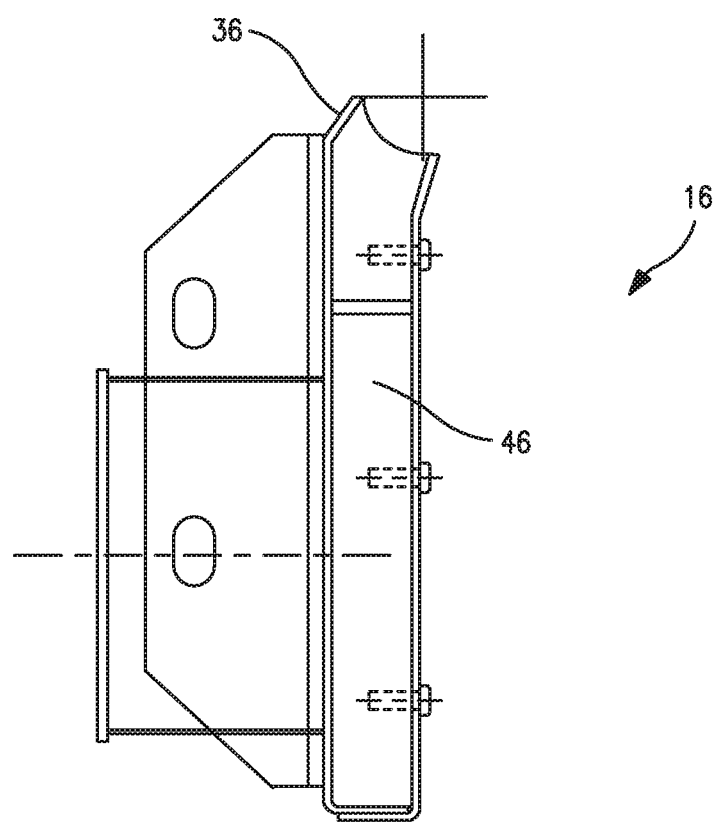
FIG. 7 is a side view of a vacuum reservoir in accordance with certain embodiments.

Turning now to FIGS. 1-6, there are shown details of the web lifter and stabilizer assembly 10 in accordance with certain embodiments. For simplicity, the vacuum reservoir 16 is not shown in these figures. The body 50 includes an elongated J-shaped member 20 coupled to elongated bent member 21. Although two separate members are shown, those skilled in the art will appreciate that a single integral body 50 could be formed. As best seen in FIG. 4, elongated J-shaped member 20 is longer in the web width direction than bent member 21, since the web 100 is always wider than the coated area (e.g., by at least 25 mm). Extending the J-shaped member out beyond the die lips of a slot die coater 200 helps stabilize the uncoated edges of the web 100. If this were not in place, the edges would crease and flip up and down as they traveled over the die, creating coating defects at the edge of the coating. Elongated J-shaped member 20 includes a straight or flat portion 20A that contacts the web when the device is in the on coat position, and defines the aforementioned leading edge. Preferably the surface of the portion 20A is a smooth and highly polished (e.g., to a mirror finish) metal surface. In certain embodiments, a low friction coating such as TEFLON® may be applied to surface of 20A. Anti-friction coatings may include anti-wear elements such as ceramic beads to reduce friction and resist wear. Such coatings are available from Racine Flame Spray of Racine, Wis., USA, and other sources of plasma spray coatings. The surface may also be machined to a smooth surface. Elongated J-shaped member 20 also includes a curved or U-shaped portion 20B, the U-shape having a curvature matching that of the shaft stubs 12 and a radius slightly larger than the radius of the shaft stubs 12 so that the shaft stubs 12 sit within the U-shape as seen in FIG. 1. As best seen in FIGS. 5 and 6, the U-shaped portion 20B of the elongated J-shaped member includes a plurality of spaced apertures 24a-24n along its length. In certain embodiments, the apertures 24a-24n are each 0.5 inches in diameter, and are positioned so that the center of each aperture is 30° from the longitudinal centerline x (FIG. 6) of the J-shaped member 20. The apertures 24a-24n are located between the spaced shaft stubs 12, and allow for fluid communication from the slot 25 to the vacuum reservoir, as discussed in greater detail below. Extending from the U-shaped portion 20B is straight portion 20C, which is shorter than straight portion 20A. In the embodiment shown, the U-shaped member 20B, the portion 20A and the straight portion 20C are a single, integral metal piece.

Figure 2:
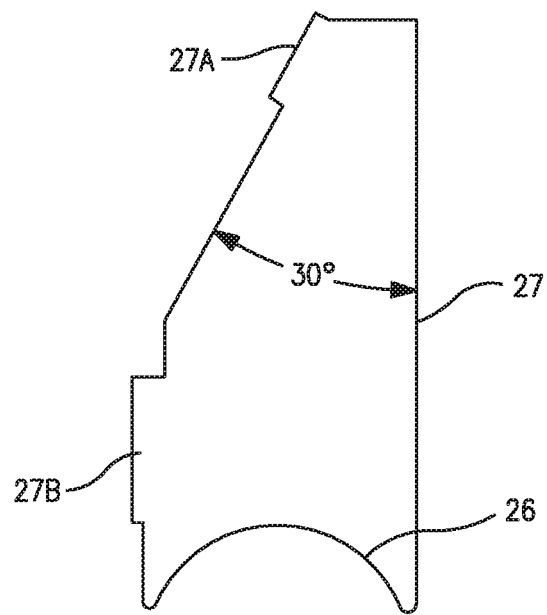
FIG. 2 is a front view of a gusset for the web lifter and stabilizer in accordance with certain embodiments.
Figure 3:
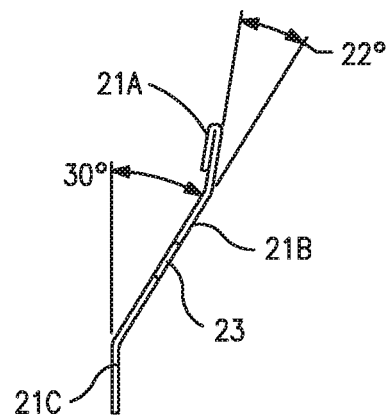
FIG. 3 is a cross-sectional view of a portion of the web lifter and stabilizer in accordance with certain embodiments.

FIGS. 1 and 3 also show the bent member 21, which in certain embodiments includes a short top portion 21A, which bends at a 22° angle to middle portion 21B, which in turn bends at a 30° angle to bottom portion 21C. In certain embodiments, the short top portion 21A has an overlapping bend to keep it straight/flat and to make it rounded so as to not rip the web. In certain embodiments the top portion 21A may be fabricated from a strip of machinable material and milled to a specified flatness matching the flatness of the die lips upon which the surface 21A rests when in the on-coat position. Bottom portion 21C is coupled to portion 20C of the elongated J-shaped member 20 such as by welding. The bent member 21B includes a plurality of spaced punched slots 23, each preferably centrally located along the length of the bent member to receive tabs 27A and 27B on gusset 27 (FIG. 2). When so coupled, the middle portion 21B of bent member 21 cooperates with straight portion 20A of elongated J-shaped member 20 to form a slot 25 (FIG. 1). In certain embodiments, the slot 25 can be 0.16 inches wide. In certain embodiments, negative pressure is applied to the slot 25 in the range of from 0.5 inches to 1.5 inches wc, depending on the tension in the web. In certain embodiments, the middle portion 21B is angled such that when the device is in operation and in the on coat position, the middle portion 21B is parallel or substantially parallel to the side of the slot die coater 200. The short top portion 21A defines the aforementioned trailing edge of the body 50.

A plurality of spaced gussets 27 (FIG. 2) are positioned in spaced relation along the length of the device. Tab 27A of each gusset 27 is received in a respective slot 23 of bent member 21 and tack welded there. Tab 27B of each gusset 27 is received in a respective cutout at the terminal end of portion 20C of elongated J-shaped member 20. In certain embodiments, there are five spaced gussets positioned along the length of the device. Each gusset 27 includes an arc-shaped bottom portion 26 configured to accommodate the shaft 12. The gussets help hold the vacuum slot 25 gap/width and help in maintaining cross web surface flatness.

Figure 8:
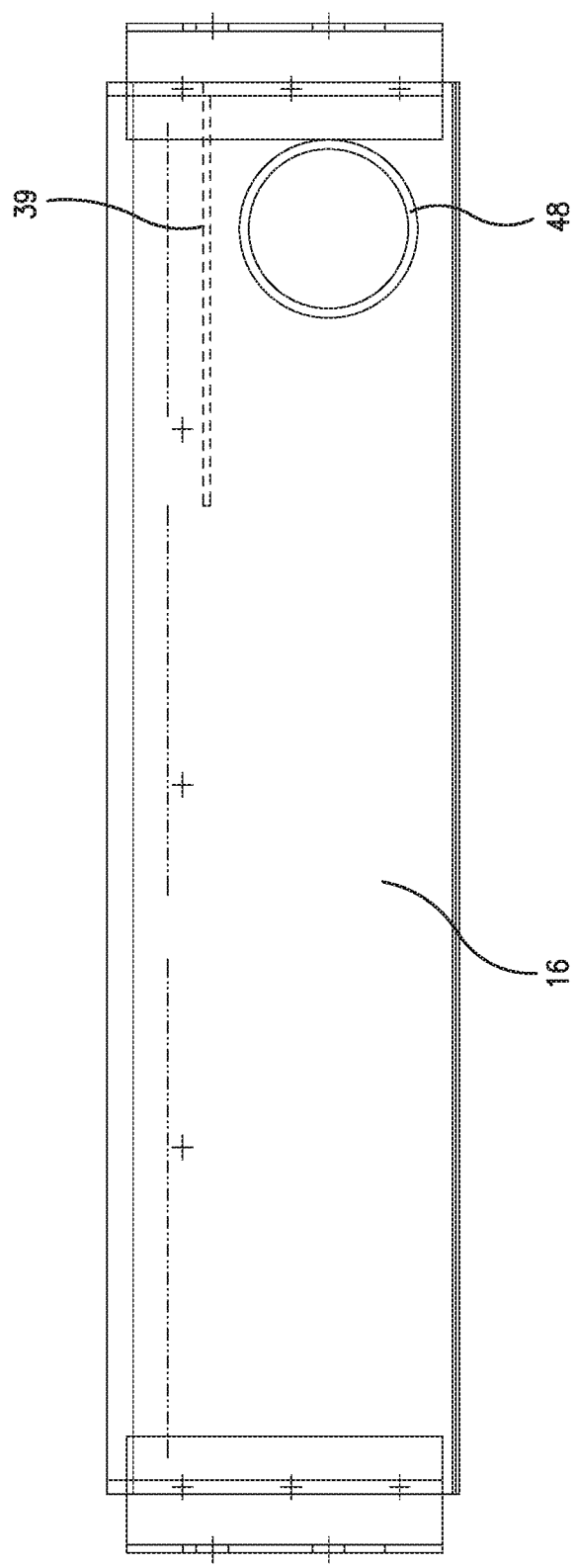
FIG. 8 is a top view of the vacuum reservoir in accordance with certain embodiments.
Figure 9:
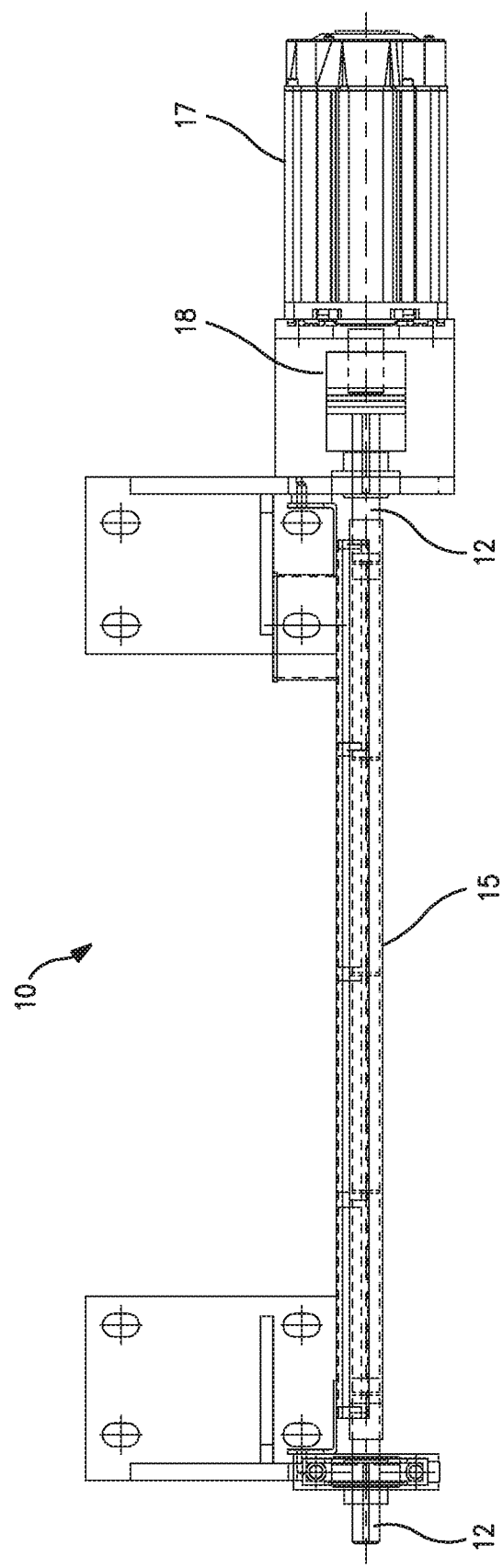
FIG. 9 is a top view of the assembly of the web lifter and stabilizer rotation device in accordance with certain embodiments.

Turning now to FIGS. 7-12, there is shown vacuum reservoir 16. In certain embodiments, the vacuum reservoir 16 includes an arc-shaped portion 36 that connects to the U-shaped portion 20B of the elongated J-shaped member 20, as can be seen in FIG. 11. This creates fluid communication between the slot 25 and the vacuum reservoir 16 so that air entering the slot 25 passes through the plurality of holes 24a-24n in the U-shaped member and enters the vacuum reservoir, and then ultimately flows back to the fan inlet and is dumped to ambient. Preferably the radius of the arc-shaped portion matches the radius of the U-shaped portion to facilitate the connection. The arc-shaped portion 36 bends at its distal end to define an elongated portion 46 that forms the remainder of the vacuum reservoir. An aperture 48 (FIG. 8) is formed in a wall of the reservoir 16 to provide fluid communication to a vacuum source, such as a fan, through suitable ducting and/or hosing. In certain embodiments, the negative pressure is drawn from the backside of the reservoir 16 outside the web width for the feed hose clearance, a 1" wc slot pressure difference is created across the length of the reservoir, with the side closest to the hose connection 48 being higher. To accommodate this, a perforated diverter 39 can be placed in the reservoir as shown in FIG. 8 to even out the cross web pressures in the vacuum slot. The size of the diverter will depend in part on the width of the web stabilizer, and the determination thereof is within the skill in the art.

A remote mounted fan can be used as the source of negative pressure, or the inlet of the supply fan in the web dryer that may be associated with the assembly can be used as the suction source. A flex hose with a damper to control negative pressure can be attached to the vacuum reservoir via the hole 48.

In operation during a continuous web coating process, the device 10 is placed next to a slot die coater 200, immediately upstream thereof, in the direction opposite of web travel, as shown in FIG. 13A. The device is stationary and negative pressure is applied to the slot 25 (e.g., negative pressure is applied to the body, through the vacuum reservoir 16 or through a passage in shaft 12a, such as with a fan or the like) to flatten the web and hold it down on the slot die coater 200 positioned immediately downstream of the device 10. As the moving web 100 travels over the leading highly polished surface 20A of the web lifter and stabilizer assembly 10, a static or frictional force is created that attracts the foil web 100 to the flat surface 20A of the device to assist in flattening the web along with the negative pressure slot 25. In a preferred embodiment, the negative pressure applied at slot 25 is typically in the range of −0.2 to −2 inches of water and may be adjusted by means of a valve (not shown) in the vacuum line connected to the suction source to obtain the desired degree of flattening while minimizing the amount of frictional drag imparted on the moving web. In certain embodiments, the device is positioned within 0.375 to 0.500 inches of the slot die coater 200 discharge area, and slightly below the discharge lips 201 of the slot die coater 200 to allow the web to wrap over the slot die coater for better contact and coating quality during coating. When a gap is desired in the coating on the web 100, the device 10 is rotated about the longitudinal axis of the shaft stubs 12 (and 12a with alternate suction through shaft 12a), such as from 1 to 3 degrees depending on the process control, such as by actuating a shaft stub 12 with motor 17, to lift the web 100 off of the slot die coater 200 (the Off Coat Position shown in FIG. 13B). In certain embodiments, the fan remains on at all times to maintain a constant negative pressure. After a predetermined amount of time (or web distance) to obtain the correct skip length, the servo motor 17 associated with the device 10 rotates the device 10 back down below the slot die coater 200 to the On Coat Position. The cycle then repeats.

The ability of the web lifter/stabilizer device to guide and flatten a travelling web can be utilized in applications where web lifting is not required. In such applications, the device need not be rotatable.

Figure 17:
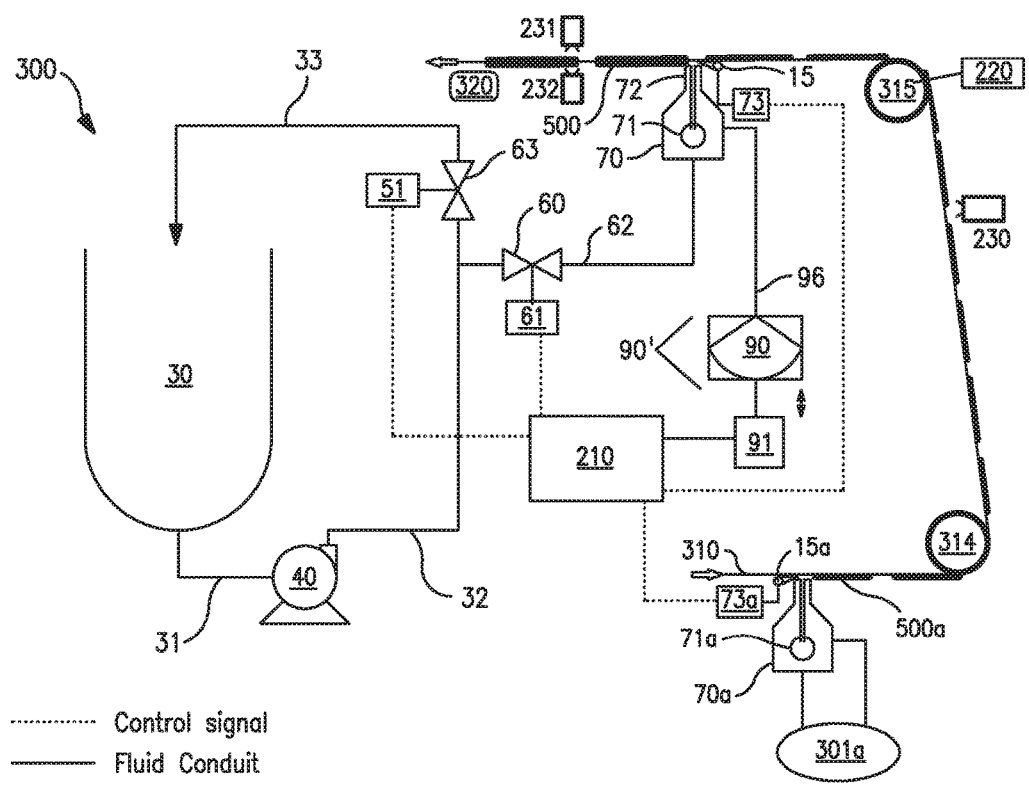
FIG. 17 shows a representative system in accordance with certain embodiments.

FIG. 17 shows a representative embodiment of the fluid system and control elements in accordance with certain embodiments. In this embodiment, the system comprises a coating fluid reservoir 30, pump 40, bypass valve 63, supply valve 60, nozzle 70 and web lifter 15. Optionally, a fluid displacement mechanism 90' is included to alternatingly draw and replace a small volume of fluid through conduit 96. A controller 210 is incorporated into the system, which is able to control the actions of the bypass valve 63, the supply valve 60, and web lifter/stabilizer 15. In some embodiments, which utilize a fluid displacement mechanism, the controller 210 controls the actions of fluid displacement actuator drive 91.

The controller 210 includes a processing unit which executes computer readable instructions, adapted to perform the actions described below. The processing unit may be a general purpose computing device, such as a microprocessor. Alternatively, it may be a specialized processing device, such as a programmable logic controller (PLC). The controller 210 also contains a storage element, which is used to store the instructions, as well as provide temporary storage for the processor's use. The storage element may utilize any memory technology, such as RAM, ROM, EEPROM, Flash ROM, NVRAM, or any other suitable technology. The controller 210 also includes an input device, such as a touchscreen, keyboard, or other suitable device. The input device is used to allow the operator to input a set of parameters or a profile which should be used by the controller 210. This input device may also be referred to as a human machine interface or HMI. The controller 210 also has outputs adapted to control the valves and nozzle as described above. These outputs may be analog or digital in nature, and may provide a binary output (i.e. either on or off), or may provide a range of possible outputs, such as an analog signal or a multi-bit digital output. Using these outputs, the controller 210 is able to control the opening and closing of bypass valve and supply valve 60, as well as the speed at which these operations occur. Similarly, it can control the movement of the web lifter 15, as well as the speed of that movement.

The valve actuators 51 and 61 driving valves 50 and 60, respectively, and fluid displacement actuator 91 driving chamber 90 are preferably servomotor drives having precise positioning capability at high travel speed. Preferably, the actuators 51 and 61 are capable of driving their respective valves through the travel range from open to closed and closed to open positions in less than 50 milliseconds. Similarly, actuator 91 is selected to expand volume chamber 90 in less than 50 milliseconds and return to the compressed position in less than 50 milliseconds. Web lifter/stabilizer 15 is positioned by actuator 73, preferably a servomotor having high speed positioning capability to complete the full cycle from on-coat position to the off-coat position and from off-coat position back to web coating-on position in less than 50 milliseconds.

To establish a profile of the thickness of one or more coated patches to be applied along a length of a sheet comprising a continuous web in the direction of web travel, the operator may enter the position on the sheet referenced to a starting position, and additional reference positions defined in terms of web travel distance for control of actuation of the various valves 50, 60 and lifter/stabilizer 15. These reference positions are initially determined from the desired lengths of coated and uncoated areas to be applied to the web to produce one or more coated patches of precise dimension along the direction of web movement with intervening segments of uncoated web having a second precise dimension along said web movement direction. These reference position parameters may also be adjusted depending on various criteria, such as the fluid rheology, and slot die setup.

The following describes an example in which the operator sets the parameters to produce coated patches of a precise desired length. Referring to the supply valve 60, the operator may provide the "position at which the valve opens", "position at which the valve closes", or an intermediate "open" and "closed" positions wherein the valve is partially open or partially closed. In some embodiments, the operator may supply a set of positions and a corresponding indication of the state of the valve, such as 20% open, 40% open, etc. In some embodiments, the opening and closing of the valve 60 may follow a custom mathematical curve. For example, the mathematical curve may be a linear ramp, an exponential function, a step function, or a parabolic function, or any combination of the previous. Similar parameters may be used for the bypass valve 63. In one embodiment, profiles are determined through a working knowledge of the coating being applied and by generating a corresponding timing diagram. The valve timing and open/close profiles are then refined through experimentation.

The movement of the lifter/stabilizer 15 can also be controlled by the controller 210. In some embodiments, the lifter 15 is rotated by an actuator 73 to displace the web from the lips 72 of nozzle 70. The operator may enter a reference position when the lifter/stabilizer 15 starts moving away from the lips 72. The operator may also enter a reference position when the lifter/stabilizer moves toward the die lips. Subsequently, the speed of movement is automatically adjusted based on the line speed and web position relative to the slot die. As above, a graph of the position of lifter 15 vs. sheet position may be a simple linear ramp, an exponential function, or a parabolic function. This graph determines the speed of movement of the lifter 15. In some embodiments, the operator may supply a set of reference positions and a corresponding indication of the state of the lifter, such as 20% away from the die lips, 40% away from the die lips, etc.

Similarly, the movement of the optional fluid displacement mechanism 90' may be likewise programmed and controlled.

It is likely that certain combinations of parameters for the valves 50, 60, web lifter 15 and fluid displacement mechanism 90' will be utilized frequently. Therefore, in lieu of entering all of the parameters for each component separately, the operator may create a "recipe", which is a predefined set of parameters which describe the operation of all of the components. At a later time, the operator can simply enter the name of the recipe, which conveys all of the associated details movement information to the processing unit. In some embodiments, the details of each recipe are stored in the storage element in the controller 210. For example, a "recipe" may be stored that generates the coating pattern shown in FIG. 19, while a second "recipe" generates the coating pattern shown in FIG. 21. In addition, the recipe may be stored locally and control only the coated patch profiles, or it may be stored remotely as part of a larger global recipe that stores other variable conditions such as line speed, web tension, dryer settings, and settings for other equipment that is integrated to the coating line.

Figure 16:
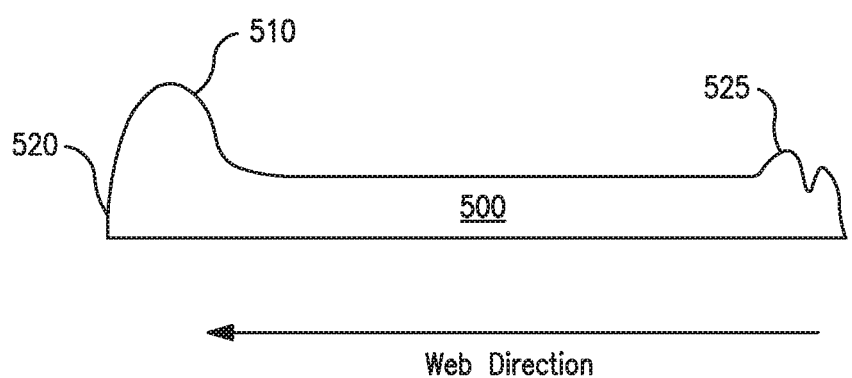
FIG. 16 shows the profile of a coating applied to the sheet using the system of FIG. 15.
Figure 18:
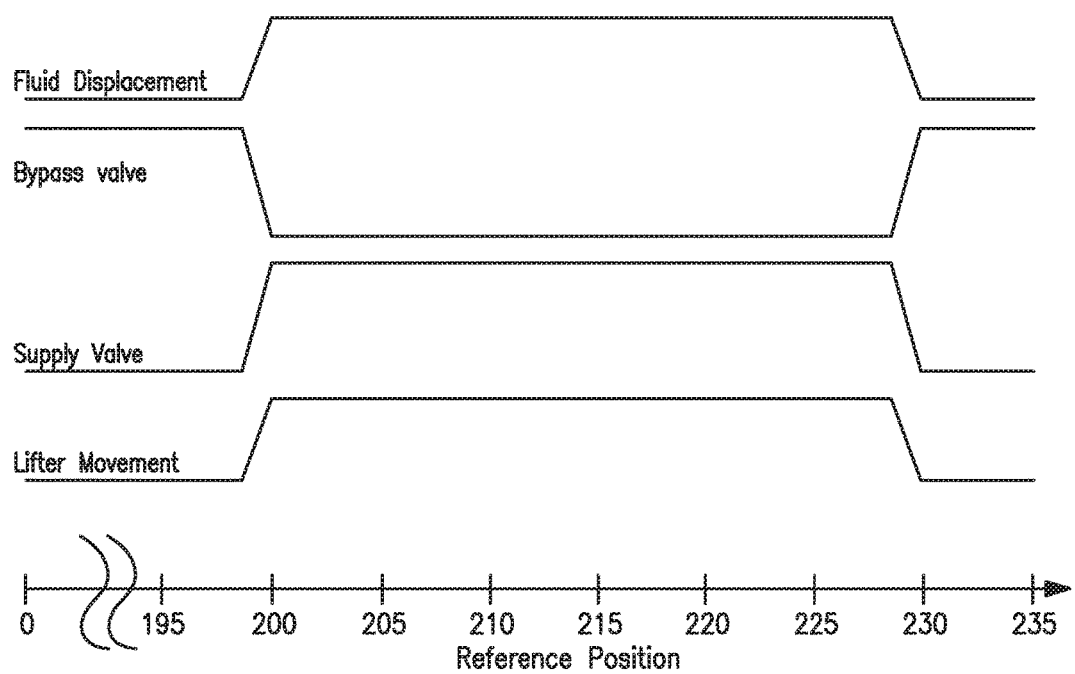
FIG. 18 shows a timing diagram used to produce the coating profile of FIG. 16.

Using this controller, the operating characteristics of the various components can be programmed to create a wide range of coating profiles. For example, FIG. 18 shows the operation of the bypass valve 63, the supply valve 60, and the web lifter 15 which can be used to create the profile shown in FIG. 16. The horizontal axis represents distance on the sheet. This profile assumes that the coating is applied for 200 mm, and then is not applied for 30 mm. This pattern is then repeated. The embodiments disclosed herein are not limited to this pattern. Indeed, the coated and uncoated portions can be as small as 1 mm and can be arbitrarily large.

The following embodiments utilize the reference position of the sheet along the direction of web travel to determine the actions of the various components. The position of the substrate materials is tracked by a high resolution encoder 220 attached to a roller shaft. In another embodiment, the encoder is coupled to a drive motor that represents web movement. Upon initial start of the coating operation, the length of web travel in relation to the location of die lips 72 is computed from encoder information and translated into terms of web reference position. The signals from encoder 220 are in communication via a data bus to the servo drive controls of servomotors 51, 61, 73 and 91 to carry out the respective positioning actions of valves 50, 60, web lifter 15 and fluid displacement chamber 90, respectively. As is known to those skilled in the knowledge of application of servo drives, these positioning actions may be carried out at very high speed with excellent precision according to mathematically programmed cam action profiles defined by the user. Positioning actions of two or more actuators may be coordinated to obtain precise control of the patch location and coating thickness profile and are represented as timing diagrams.

FIG. 18 shows an example timing diagram wherein at reference position 199.5 mm, the bypass valve 63 begins to open, while the supply valve 60 begins to close. This operation is completed by reference position 200 mm, therefore the transition between the coating region and the uncoated region is very abrupt. This rapid transition tends to leave excessive coating in the nozzle 70, which is unevenly applied when the supply valve 60 next opens at time 230 (see FIG. 16). While the valves 50, 60 are being actuated, the web lifter 15 is moved from its on-coat position to an off-coat position, away from the die lips 72. This movement begins at reference position 199.5 mm and ends at reference position 200 mm. The coating is again applied at reference position 230 mm. In preparation for this application, the bypass valve 63 begins to close at reference position 229.5 mm. The bypass valve 63 is closed by reference position 230 mm. The supply valve 60 executes a similar profile going from the closed state to the open state beginning at position 229.5 mm and ending at position 230 mm. The web lifter is also moved into the on-coat position as well. This movement begins at reference position 229.5 mm and is completed by reference position 230 mm.

It should be noted that while the examples presented herein demonstrate the supply valve 60 and the bypass valve 63 operating in concert, this is not a requirement. In other words, these valves 50, 60 are separate and their actuation may be controlled separately. In another embodiment, a three way valve may be employed, in which case, the actuation of these valves would be dependent on each other.

In some embodiments, particularly at higher coating speeds exceeding 5 meters per minute, a fluid displacement mechanism 90' is preferably used as shown in FIG. 17. In these embodiments, the fluid displacement mechanism 90' may be a chamber 90 having a changeable volume and a single fluid connection 96, such that when the volume increases, material is drawn away from the nozzle lips 72 into cavity 71, through conduit 96 and into the chamber. Conversely, when the volume decreases, material in the chamber 90 is forced back through conduit 96 into the nozzle cavity 71 and into nozzle lips 72 and is applied to the sheet. In the profile shown in FIG. 18, the fluid displacement chamber 90 of FIG. 17 is preferably driven by a linear actuator 91 which begins to expand the volume of chamber 90 at reference position 199.5 mm and is fully expanded by reference position 200 mm. When the material is to be applied again, the fluid displacement chamber 90 is decreased in volume by actuator 91 at reference position 229.5 mm. This chamber contraction is complete at reference position 230 mm.

Figure 23:
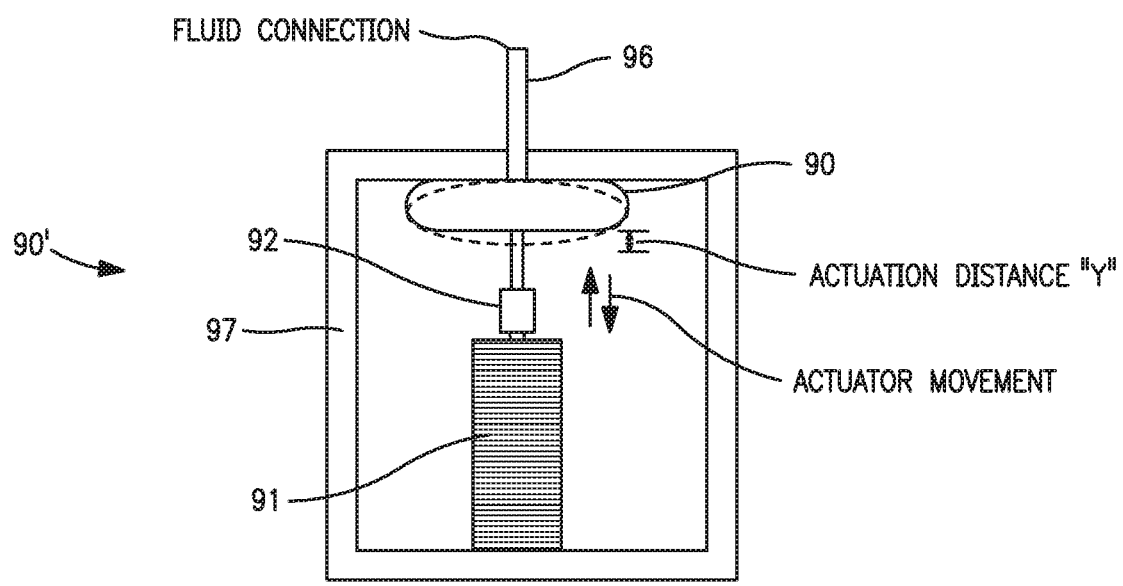
FIG. 23 shows a representative embodiment of an optional fluid displacement mechanism.

Referring to FIG. 23, the fluid displacement mechanism 90' may be comprised of a sealed bellows or diaphragm element to form chamber 90 which is attached to stationary frame 97 which supports both the chamber 90 and actuator 91. Actuator 91 is mechanically connected to the diaphragm element of chamber 90 by a mechanical coupling 92 to move the position of the diaphragm inward to chamber 90 to reduce the internal volume, or outward from chamber 90 to increase the internal volume. Fluid conduit 96 is in fluid communication with the internal volume of chamber 90 and is also in fluid communication with the fluid system of FIG. 17. Prior to operation, the chamber 90 and conduit 96 are filled with coating fluid, coating solvent, or other suitable fluid media to prime the fluid displacement mechanism. In operation, the actuation distance "Y" is controlled by actuator 91 in accordance with the instructions from controller 210 of FIG. 17. In order to allow fast actuation of the fluid displacement action, the design of the diaphragm element of chamber 90 is to be made with consideration of minimizing the actuation distance while obtaining the desired change in internal volume in the expanded state versus the volume in the contracted state. Travel distance is preferably less than 6 mm for a response speed less than 50 milliseconds. The diaphragm may be selected from commonly available elastomeric materials, optionally reinforced with fabric strands, and sealed to a rigid shell or bowl to form the variable volume chamber 90. In a preferred embodiment, the volume chamber is constructed as a metal bellows of corrosion and solvent resistant material such as T304 stainless steel. A single bellows type is preferred for effective priming of the chamber to avoid inclusion of air bubbles during operation. The forgoing descriptions of the variable volume chamber 90 are meant to be exemplary as numerous designs of bellows and diaphragm elements are known to those skilled in the art and may be applied to meet the requirements for minimal actuation distance, fast speed, and volume displacement.

It is to be appreciated that the coating fluid contained in chamber 90, conduit 95, cavity 71 and die lips 72 undergoes a reversal in flow direction for each actuation by actuator 91 such that fluid is temporarily displaced from the exit of die lips 72 into the die cavity 71 and into fluid displacement chamber 90 when expanded and then returned via the same path to the die lips 72 when the chamber 90 is compressed. Therefore, coating fluid is not withdrawn from the process to accommodate the control of the deposition of fluid on the web to make discrete coated patches of precise dimension.

Figure 19:
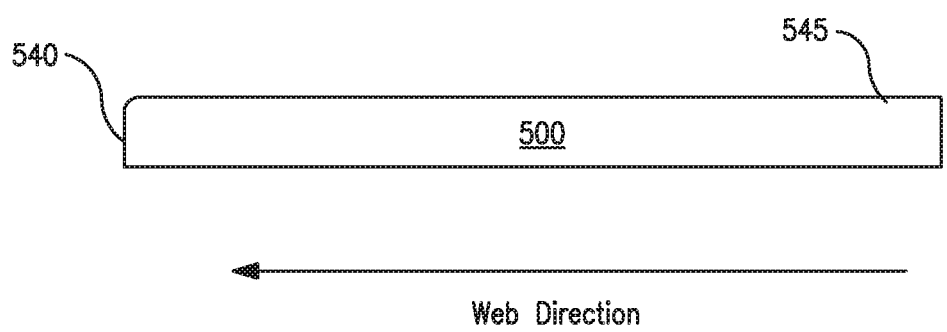
FIG. 19 shows a second profile of a coating that may be applied to a sheet in accordance with certain embodiments.
Figure 20:
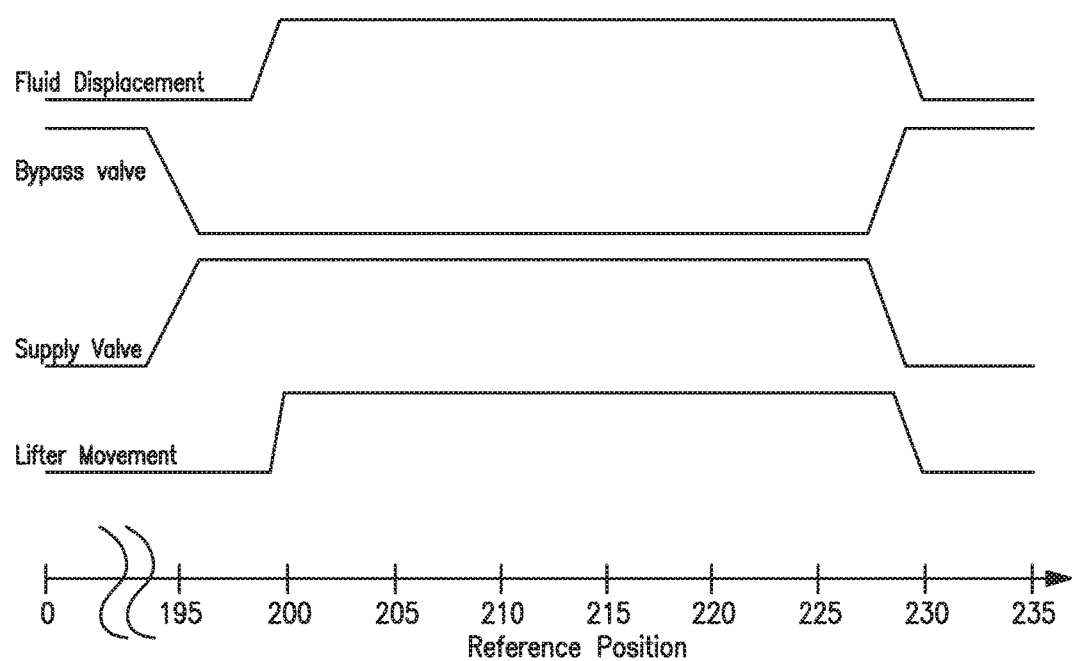
FIG. 20 shows a timing diagram used to produce the coating profile of FIG. 19.

Of course, other coating profiles may be desired. FIG. 19 shows a coating profile where the leading edge 540 is much more even than that of FIG. 16. Trailing edge 545 is also more even and abrupt. To create this profile, the timing and speed of the various components is modified from that explained in conjunction with FIG. 18. A representative timing diagram that may be used to create this coating profile is shown in FIG. 20.

In this profile, the supply valve 60 and bypass valve 63 are controlled so as to begin closing earlier. In this profile, these valves 50, 60 begin transitioning by reference position 195 mm and are completely transitioned by reference position 196 mm. The web lifter 15 is not moved until reference position 199.5 mm, and is quickly moved away from the die lips 72. When the coating is to be applied again, the valves begin transitioning by reference position 228 mm and are completely transitioned by reference position 229.5 mm. The web lifter 15 is moved toward the die lips 15, starting at reference position 229 mm and is completed by reference position 230 mm. In those embodiments where a fluid displacement mechanism 90' is utilized, the fluid displacement chamber 90 begins to expand at reference position 199 mm and is fully expanded by position 200 mm. Before the coating is applied again at position 230 mm, the fluid displacement chamber 90 begins to contract at reference position 229 mm. Its contraction is completed at reference position 230 mm.

Figure 21:
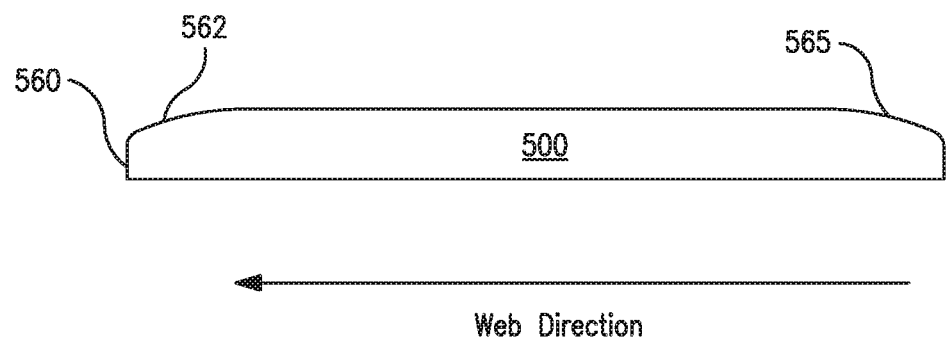
FIG. 21 shows a third profile of a coating that may be applied to a sheet in accordance with certain embodiments.
Figure 22:
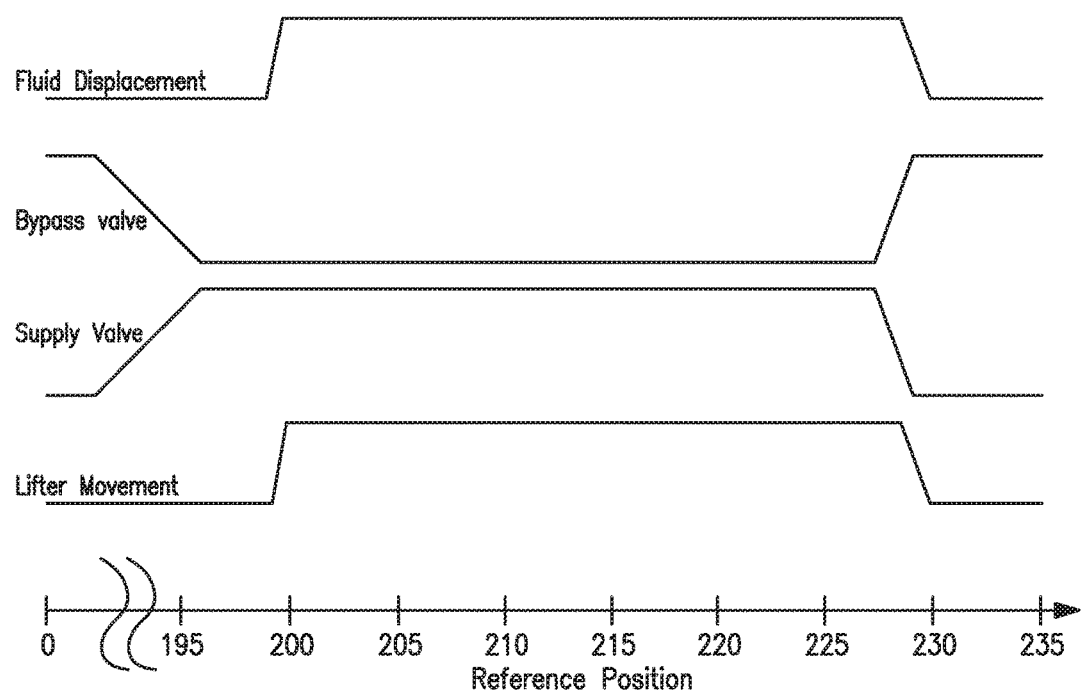
FIG. 22 shows a timing diagram used to produce the coating profile of FIG. 21.

FIG. 21 shows another coating profile that can be created using embodiments disclosed herein. In this embodiment, the leading edge 562 is ramped to its maximum value. Similarly, the trailing 565 is tapered, rather than abrupt. FIG. 22 shows a timing diagram that may be used to create this profile. In this embodiment, the valves 50, 60 open and close more slowly, so as to create the tapered leading edge 562 and trailing edge 565.

It should be noted that the representative timing diagrams described herein are not the only timing diagrams that can be used to create the desired coating profiles. In addition, other coating profiles are possible and can be created by varying the operation of the valves, nozzle and fluid displacement mechanism.

The use of a controller to control the actuation of the valves 50, 60 and the movement of the web lifter 15 may allow the elimination of a fluid displacement mechanism 90', particularly at coating speeds below 5 meters per minute. For example, by precisely controlling the position and the speed at which the valves turn on and off, the amount of excess coating that remains in the nozzle 70 can be reduced.

In the examples above, the system is programmed by referencing all actuations to position. In another words, the system receives input wherein an absolute position and a desired action are presented together. However, other points of references may be used to indicate when an action should take place. For example, the actions of the valves 50, 60 and the web lifter 15 may be referenced to the turn-on and turn-off positions. For example, the user may specify that the coating should be applied for 200 mm, followed by a 30 mm uncoated region. The actuation of the valves 50, 60 may be input as relative offsets from these turn-on and turn-off positions. Referring to FIG. 20, the valves would be programmed to being transitioning at position offset −6 mm (200 mm-194 mm), and would complete this transition at position offset −4 mm. Similarly, the next transition of the valves would be referenced to the turn-on position (230 mm). This method of conveying information to the controller may be extremely valuable, as it allows the same coating profiles to be used with different length regions, by simply modifying the turn-on and turn-off locations, without modification to the other parameters.

Another advantage of the position based reference system described herein is that the controller may automatically compensate for changes in coating speed. For example, if the speed of the roller 315 is changed, the controller can determine that the times associated with each actuation are different and can compensate for this change and generate the same coating profile as was done previously.

The controller can also be used to apply a coating to the opposite side of a previously coated sheet as well. In a preferred embodiment shown in FIG. 17, a web 310 is coated on a first side by a first coating nozzle 70a having a fluid delivery system 301a and web lifter 15a operating as previously described to coat patches of a desired length, spacing and thickness profile in the direction of web travel. The web path is then re-directed by rollers 314 and 315 by turning on the uncoated side of the web in order to present the web in the preferred orientation at a second coating nozzle 70. The second side of the web 310 is then coated as previously described. In some embodiments, it is imperative that the coating patches on the first side are exactly aligned with those created on the opposite side. In other embodiments, it may be desirable to advance or delay the application of coating relative to the pattern on the first side. Using the input device, the operator can program the registration of the opposite side. In some embodiments, this is achieved by programming the start and stop positions to have a certain relationship to the previously applied coatings on the first side. In other embodiments, the operator enters the desired offset (i.e. 0 indicates alignment, positive values indicate a delay and negative values indicate an advancement). In this embodiment, the system may contain a vision system 230 as shown in FIG. 17 positioned to view the previously coated patches and capable of detecting the transition between an uncoated region and a coated region. Once this web position point is determined, the controller can use the speed of the roller 15 as computed from the signal of encoder 220 or a suitable roller drive information signal to determine the time at which coating should be applied to the second side. The vision system 230 may be comprised of a contrast sensor in data communication with controller 210 and with servo drives controlling actuators 51, 61, 71 and 91. A number of such vision systems are available in the industrial controls and sensors market and may be selected to provide fast response speed in order to report the detected transitions from coated to uncoated locations on the moving web and from uncoated to coated locations in order to effect timely action by controller 210 and the servo drives controlling servomotors 51, 61, 71, and 91. Response time for the contrast sensor device is preferably less than 100 microseconds. In embodiments including the vision system for registration of patches, the controller 210 must be capable of processing all mathematical operations to initiate the actuator and drive motor actions at a frequency at least 2 times the rate at which the desired coated patch sequences (coated and uncoated lengths) are passing by the sensor 230.

Another, more preferred type of registration controller not only senses the edge of the coating patch before it arrives at the coating head for alignment of the coating patches, but also has a second set of sensors 231 and 232 that measure the alignment of the two coated patches and compares the measured value against the target value and automatically applies a correction to the registration distance of the subsequent coated patch. This type of system provides for more robust operation by providing both feed-forward and feed-back control of the coating registration process and can automatically compensate for the time lags associated with communication delays among the various control systems used in the entire coating device. Furthermore, this preferred type of registration system improves the production yield by reducing the number of defects caused during changes in the coating line speed, or tension changes due to splices, for example.

Another benefit from the preferred coating registration method is that the coating patches are automatically measured and the measurement data can subsequently be recorded into a data logging system for statistical analysis and quality control.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for applying a coating to a material, travelling in a path, comprising:
   a nozzle to apply said coating;
   a supply valve in communication with said nozzle to allow the flow of coating to said nozzle;
   a bypass valve to direct the flow of coating away from said nozzle;
   a fluid displacement mechanism to draw coating away from said nozzle after said supply valve has been closed, wherein said fluid displacement mechanism comprises a chamber having a changeable volume; and
   an actuator positioned such that movement of said actuator causes a change in said volume;
   a web lifter moveable to deflect said material, said web lifter having a surface and a body moveable between a first position in which said material travels in an undeflected state and a second position in which said material is deflected by said body so as to travel in a deflected state, said web lifter body having a first portion defining a leading edge of said body, and a second portion defining a trailing edge of said body, said first portion being spaced from said second portion so as to define an air entry slot between them for the entry of air upon the application of negative pressure to said body, and a vacuum source in fluid communication with said body for receiving said air that enters said slot, said applied negative pressure positioning said web into contact with said surface; and a controller in communication with said supply valve, said bypass valve, said actuator, said nozzle and said web lifter so as to control the application of said coating to said material.

2. The system of claim 1, wherein said controller comprises memory storage to store reference position data for said travelling material.

3. The system of claim 2, wherein said reference position data comprises positions of said travelling material where said supply valve is to open and close.

4. The system of claim 2, wherein said reference position data comprises positions of said travelling material where said bypass valve is to open and close.

5. The system of claim 2, wherein said reference position data comprises positions of said travelling material where said web lifter is to be actuated to deflect said material.

6. The system of claim 1, further comprising a sensor in communication with said controller for tracking the position of said material.

7. The system of claim 1, wherein said web lifter is positioned upstream of said nozzle in the direction of travel of said material travelling in said path.

8. The system of claim 1, wherein said material is a conductive substrate.

9. The system of claim 1, further comprising a source of negative pressure in fluid communication with said body of said web lifter.

10. The system of claim 1, wherein said controller is configured to rotate said body of said web lifter.

11. The system of claim 1, wherein said controller controls the opening and closing of said bypass valve and the speed at which said bypass valve is opened and closed.

12. The system of claim 1, wherein said controller controls the opening and closing of said supply valve and the speed at which said supply valve is opened and closed.

* * * * *